United States Patent
Ibrahim et al.

(10) Patent No.: US 12,286,350 B1
(45) Date of Patent: Apr. 29, 2025

(54) METHOD FOR GENERATING HYDROGEN USING $Bi_2O_3$@$SiO_2$ NANOCOMPOSITE CATALYST

(71) Applicant: IMAM MOHAMMAD IBN SAUD ISLAMIC UNIVERSITY, Riyadh (SA)

(72) Inventors: Mohamed Nady Abd El-Hameed Ibrahim, Riyadh (SA); Mohamed Khairy Omran, Riyadh (SA); Babiker yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/967,141

(22) Filed: Dec. 3, 2024

(51) Int. Cl.
*C01B 3/06* (2006.01)
*B01J 23/18* (2006.01)
*B01J 37/00* (2006.01)
*B01J 37/08* (2006.01)

(52) U.S. Cl.
CPC .............. *C01B 3/065* (2013.01); *B01J 23/18* (2013.01); *B01J 37/0027* (2013.01); *B01J 37/08* (2013.01); *B01J 2523/41* (2013.01); *B01J 2523/54* (2013.01)

(58) Field of Classification Search
CPC ....... C01B 3/065; B01J 23/18; B01J 37/0027; B01J 37/08
See application file for complete search history.

(56) References Cited

FOREIGN PATENT DOCUMENTS

| CN | 104925753 A | 9/2015 |
|---|---|---|
| CN | 106622259 B | 2/2019 |
| CN | 115869931 A | 3/2023 |
| CN | 116851016 A | 10/2023 |
| CN | 117414851 A | 1/2024 |

OTHER PUBLICATIONS

Shreya Sarkar, et al., "Evolution of dealloyed PdBi2 nanoparticles as electrocatalysts with enhanced activity and remarkable durability in hydrogen evolution reactions", Journal of Materials Chemistry A, vol. 5, No. 30, Jul. 10, 2017, pp. 15950-15960.

Manas Kumar Mandal, et al., "Investigation on borohydride oxidation performance of activated charcol supported palladium-bismuth nanoparticles electrocatalyst for fuel cell application", Journal of Applied Electrochemistry, Jun. 27, 2024, 13 pages.

*Primary Examiner* — James A Fiorito
(74) *Attorney, Agent, or Firm* — Oblon, McClelland, Maier & Neustadt, L.L.P.

(57) ABSTRACT

A method of hydrogen ($H_2$) generation includes hydrolyzing a borohydride salt in an aqueous solution including a catalyst to form gaseous hydrogen. The catalyst is a bismuth(III) oxide-doped silicon dioxide with an amount of bismuth(III) oxide from 2 wt. % to 12 wt. % based on a total weight of the bismuth(III) oxide-doped silicon dioxide. The bismuth (III) oxide is dispersed in silicon dioxide in the catalyst. The weight ratio of the catalyst to the borohydride salt present in the aqueous solution is from 0.1:2 to 7:1 and a rate of hydrolysis of the borohydride salt in the presence of the catalyst is 2 to 3 times greater than a rate of hydrolysis of the borohydride salt in the absence of the catalyst.

20 Claims, 6 Drawing Sheets

METHOD FOR GENERATING HYDROGEN USING $Bi_2O_3$@$SiO_2$ NANOCOMPOSITE CATALYST

BACKGROUND

Technical Field

The present disclosure is directed to hydrogen ($H_2$) generation techniques and, more particularly, to the synthesis of a bismuth(III) oxide-doped silicon dioxide ($Bi_2O_3$@$SiO_2$) composite catalyst for hydrogen generation.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Rapid industrialization and population growth in recent decades have increased global energy demand, highlighting a need for alternative energy sources. The depletion of non-renewable resources and rising environmental concerns, such as climate change and pollution, emphasize the urgency for transitioning to clean, renewable energy solutions. Hydrogen is considered a promising alternative to non-renewable energy sources, offering a potential to reduce dependency on fossil fuels and lower environmental impacts. Hydrogen generation from fuel cells, which emit only water vapor as a byproduct, may be an alternative energy process. While solar energy is inexpensive to generate, it faces challenges in storage due to the reliance on costly and difficult-to-dispose battery-based storage systems. In contrast, energy derived from hydrogen offers several advantages, such as a cleaner energy generation process, ease of storage due to the compressible nature of hydrogen, and elimination of battery needs. Further, energy derived from hydrogen offers several advantages over traditional battery systems as it has a higher energy density, allowing it to store more energy in a smaller volume. A high energy density is beneficial for applications like transportation where space and weight are large factors. In application, hydrogen-powered vehicles may be refueled in just a few minutes, similar to gasoline vehicles, whereas electric vehicles require longer charging times. Hydrogen fuel cells also provide longer operational ranges than battery electric vehicles, making them suitable for heavy-duty and long-distance applications. Despite these benefits, large-scale hydrogen production face challenges, such as energy-intensive methods and complexities in storage and transportation, which must be addressed for hydrogen to become a viable mainstream energy solution.

Nanocomposites, particularly metal oxide-based materials, are suitable for hydrogen production due to their high catalytic properties, including high surface area, tunable porosity, and improved electron conductivity. These properties are efficient for hydrogen generation, making hydrogen production a promising solution for large-scale energy storage over renewable sources like solar and wind power; however, the synthesis of nanocomposites for hydrogen generation involves high temperatures and long processing times, often leading to irregular particle sizes and inconsistent porosity, which may negatively affect the performance of the process. Many current synthesis techniques contribute to high operational costs and material inefficiency, with extensive milling and post-treatment steps required for non-uniform particle size distribution. Hence, issues related to production costs, infrastructure, and energy conversion efficiency must be addressed to achieve an efficient nanocomposite material.

Accordingly, an object of the present disclosure is to provide a material and method for hydrogen generation using a bismuth(III) oxide-doped silicon dioxide ($Bi_2O_3$@$SiO_2$) nanocomposite catalyst that may circumvent drawbacks and limitations, such as high cost, high lead times, low efficiency, and poor environmental performance, of methods and materials known in the art.

SUMMARY

In an exemplary embodiment, a method of hydrogen ($H_2$) generation is described. The method includes hydrolyzing a borohydride salt in an aqueous solution including a catalyst to form gaseous hydrogen. The catalyst is a bismuth(III) oxide-doped silicon dioxide ($Bi_2O_3$@$SiO_2$) and the amount of bismuth(III) oxide is from 2 weight by percent (wt. %) to 12 wt. % based on a total weight of the bismuth(III) oxide-doped silicon dioxide. The bismuth(III) oxide ($Bi_2O_3$) is dispersed in silicon dioxide in the catalyst. A weight ratio of the catalyst to the borohydride salt present in the aqueous solution is from 0.1:2 to 7:1 and a rate of hydrolysis of the borohydride salt in the presence of the catalyst is 2 to 3 times greater than a rate of hydrolysis of the borohydride salt in the absence of the catalyst.

In some embodiments, the borohydride salt is sodium borohydride ($NaBH_4$).

In some embodiments, the amount of bismuth(III) oxide is from 2 wt. % to 3 wt. % based on a total weight of the bismuth(III) oxide-doped silicon dioxide.

In some embodiments, the amount of bismuth(III) oxide is from 4 wt. % to 6 wt. % based on a total weight of the bismuth(III) oxide-doped silicon dioxide.

In some embodiments, the amount of bismuth(III) oxide is from 9 wt. % to 10 wt. % based on a total weight of the bismuth(III) oxide-doped silicon dioxide.

In some embodiments, the hydrolyzing occurs at a temperature of 25° C. to 50° C.

In some embodiments, a hydrogen generation rate is from 100 milliliter per minute per gram (mL $min^{-1}$ $g^{-1}$) to 2200 mL $min^{-1}$ $g^{-1}$ of the borohydride salt.

In some embodiments, the hydrolyzing occurs at a temperature of 30° C. and a hydrogen generation rate is from 480 mL to 500 mL of hydrogen/minute per gram (mL $min^{-1}$ $g^{-1}$) of the borohydride salt.

In some embodiments, the hydrolyzing occurs at a temperature of 35° C. and a hydrogen generation rate is from 1100 mL to 1120 mL of hydrogen/minute per gram of the borohydride salt.

In some embodiments, the hydrolyzing occurs at a temperature of 40° C. and a $H_2$ generation rate is from 1420 mL to 1440 mL of hydrogen/minute per gram of the borohydride salt.

In some embodiments, the hydrolyzing occurs at a temperature of 45° C. and a $H_2$ generation rate is from 1990 mL to 2010 mL of hydrogen/minute per gram of the borohydride salt.

In some embodiments, the catalyst is made by a process including milling a bismuth salt, silica, and a sugar to form a mixture. Further, calcinating the mixture at 400° C. to 600° C. for 3 hours to 5 hours and milling the calcinated mixture to form the catalyst.

In some embodiments, the sugar is glucose.

In some embodiments, the milling occurs at a rate of 300 rounds per min (rpm) to 400 rpm.

In some embodiments, the milling occurs for 5 to 60 minutes.

In some embodiments, the gaseous $H_2$ is formed in 0.1 to 30 minutes.

In some embodiments, the amount of the borohydride salt present in the aqueous solution is 0.1 grams (g) to 2 g.

In some embodiments, the hydrolyzing occurs at a temperature of 30° C. and a hydrogen generation rate is from 125 mL to 150 mL of hydrogen/minute per gram of the borohydride salt.

In some embodiments, the hydrolyzing occurs at a temperature of 30° C. and a $H_2$ generation rate is from 160 mL to 180 mL of hydrogen/minute per gram of the borohydride salt.

In some embodiments, generating hydrogen has an activation energy of 65 kilojoules per mole (kJ/mol) to 75 kJ/mol.

These and other aspects of the non-limiting embodiments of the present disclosure will become apparent to those skilled in the art upon review of the following description of specific non-limiting embodiments of the disclosure in conjunction with the accompanying drawings. The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure (including alternatives and/or variations thereof) and many of the attendant advantages thereof will be readily obtained as the same becomes better understood by reference to the following detailed description when considered in connection with the accompanying drawings, wherein.

DETAILED DESCRIPTION

Figure 1:
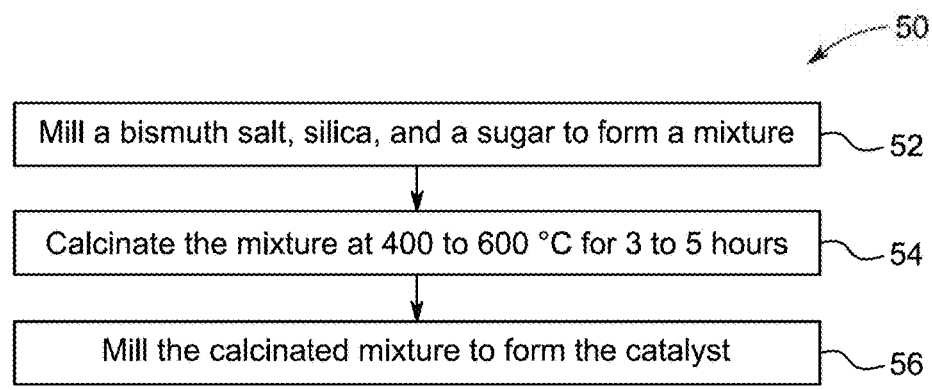
FIG. 1 is a flowchart illustrating a method of preparing a bismuth(III) oxide-doped silicon dioxide catalyst (catalyst), according to certain embodiments.

In the following description, it is understood that other embodiments may be utilized, and structural and operational changes may be made without departure from the scope of the present embodiments disclosed herein.

Reference will now be made to specific embodiments or features, examples of which are illustrated in the accompanying drawings. In the drawings, whenever possible, corresponding or like reference numerals will be used to designate identical or corresponding parts throughout the several views. Moreover, references to various elements described herein are made collectively or individually when there may be more than one element of the same type. However, such references are merely exemplary in nature. It may be noted that any reference to elements in the singular may also be constructed to relate to the plural and vice-versa without limiting the scope of the disclosure to the exact number or type of such elements unless set forth explicitly in the appended claims. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween. Within the description of this disclosure, where a numerical limit or range is stated, the endpoints are included unless stated otherwise. Also, all values and subranges within a numerical limit or range are specifically included as if explicitly written out.

As used herein, the term "milling" refers to a process of mechanical grinding or crushing in which materials are subjected to high-speed motion, often using a grinding media such as balls, rods, and/or blades, to reduce the particle size and/or to mix components of a mixture. This process can involve various types of milling equipment, such as ball mills, hammer mills, and/or planetary mills, and may be used to achieve uniformity in material composition, enhance surface area for chemical reactions, and/or facilitate synthesis of composite materials. In the context of this embodiment, milling is employed to combine and disperse the components of the catalyst mixture (i.e., bismuth(III) oxide and silica) and other ingredients (e.g., fuel and capping agents) to promote an effective and homogeneous reaction.

As used herein, the term "calcination" refers to a thermal treatment process in which a material is heated to high temperatures in the presence or absence of air or oxygen, typically to bring about a chemical transformation or remove volatile components, such as moisture and/or organic matter.

As used herein, the term "hydrolyzing" refers to a chemical process in which a substance reacts with water ($H_2O$) to break down or decompose into less complex components. In this context, hydrolysis typically involves the reaction of a compound with water to form products such as acids, bases, and/or other derivatives, often resulting in the release of gases (i.e., hydrogen and/or oxygen) and/or the formation of new chemical bonds.

As used herein, the term "hydrogen generation rate" (HGR) refers to the amount of hydrogen gas ($H_2$) produced per unit of time during a chemical reaction. A hydrogen generation rate is typically expressed in milliliters of hydrogen per minute per gram of a reactant or catalyst per unit of time. In the context of hydrogen production, the HGR is a parameter used to evaluate the efficiency and effectiveness of the reaction, especially in processes like the hydrolysis of sodium borohydride ($NaBH_4$) or other hydrogen-producing reactions.

Aspects of this disclosure describe a method of hydrogen production using a bismuth(III) oxide-doped silicon dioxide ($Bi_2O_3$@$SiO_2$) composite catalyst. Efficiently generating hydrogen through a catalytic process with the composite catalyst of the current disclosure provides a clean, sustainable, and rapid solution for hydrogen production, which assists in advancing renewable energy technologies and reducing reliance on non-renewable fuels.

According to a first aspect of the present disclosure, a catalyst is described. The catalyst is a bismuth(III) oxide-doped silicon dioxide. Bismuth(III) oxide is dispersed in silicon dioxide in the catalyst. The amount of bismuth(III) oxide ranges from 2 to 12 weight percent (wt. %) based on the total weight of the bismuth(III) oxide-doped silicon dioxide. In some embodiments, the amount of bismuth(III) oxide ranges from 2 to 12 wt. %, preferably 2.5 to 11 wt. %, preferably 3 to 10 wt. %, preferably 4 to 9 wt. %, preferably 5 to 8 wt. %, and preferably 6 to 7 wt. % based on the total weight of the bismuth(II) oxide-doped silicon dioxide. In a preferred embodiment, the amount of bismuth(III) oxide is about 2.5 wt. % based on the total weight of the bismuth(III) oxide-doped silicon dioxide. In another preferred embodiment, the amount of bismuth(III) oxide is about 5 wt. % based on the total weight of the bismuth(III) oxide-doped silicon dioxide. In yet another preferred embodiment, the amount of bismuth(III) oxide is about 10 wt. % based on the total weight of the bismuth (III) oxide-doped silicon dioxide. In a most preferred embodiment, the amount of bismuth (III) oxide is 5 wt. % based on the total weight of the bismuth (III) oxide-doped silicon dioxide Referring to FIG. 1A, a second aspect of the present disclosure describes a method 50 of synthesizing the catalyst. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes milling a bismuth salt, silica, and a sugar to form a mixture. This step may be highly exothermic and may be preferred to be performed in an inert atmosphere to prevent any unwanted side reactions, such as oxidations and/or explosions.

In some embodiments, the bismuth salt may include, but is not limited to, bismuth nitrate, bismuth subnitrate, bismuth oxychloride, bismuth subsalicylate, bismuth oxide, bismuth vanadate, bismuth acetate, bismuth citrate, bismuth hydroxide, bismuth carbonate, bismuth sulfide, bismuth subcarbonate, bismuth tartrate, bismuth phthalate, bismuth bromide, bismuth iodide, bismuth chloride, bismuth sulfate, bismuth phosphate, bismuth aluminate, bismuth titanate, bismuth ferrite, bismuth molybdate, bismuth tungstate, bismuth telluride, bismuth selenide, bismuth antimonide, bismuth arsenide, bismuth silicate, bismuth oxide chloride, bismuth dimethylglyoximate, bismuth propionate, bismuth malate, bismuth gluconate, bismuth fumarate, bismuth acetylacetonate, bismuth lactate, bismuth butyrate, bismuth tartrates, a combination thereof, and the like. In some embodiments, the bismuth salt may be hydrated. In a preferred embodiment, the bismuth salt is bismuth nitrate.

In some embodiments, the silica may include, but is not limited to, fumed silica, silica gel, precipitated silica, colloidal silica, crystalline silica, amorphous silica, silica aerogel, silica sand, silica powder, silicon dioxide, fused silica, synthetic silica, silica sol, hydrated silica, diatomaceous earth, microcrystalline silica, silica nanofibers, silica nanoparticles, silicate minerals, montmorillonite silica, silicon carbide, silica glass, silica gel beads, silica microspheres, silica spheres, silica-rich clay, silicon oxide, porous silica, silica-based zeolites, silica aerogel particles, silica aerogel composites, silica microsilica, high-purity silica, a combination thereof, and the like. In a preferred embodiment, the silica is fumed silica.

In a preferred embodiment, the sugar is glucose. In other embodiments, sugars such as sucrose, maltose, dextrose, arabinose, fructose, galactose, fucose, xylose, lactose, mannose, a combination thereof, and the like may be used in place of or in combination with glucose. The sugar acts as a capping agent and is added to prevent the uncontrolled growth of the particles and to help maintain their size, shape, and dispersion. Capping agents can also protect the surface of reactive species, preventing them from undergoing undesirable reactions and/or aggregations. In some embodiments, citric acid, polyethylene glycol (PEG), polyvinyl alcohol (PVA), polyvinylpyrrolidone (PVP), sodium citrate, starch, ascorbic acid, dextran, sodium polyacrylate, polyacrylic acid, oleic acid, lauric acid, stearic acid, hexadecyltrimethylammonium bromide (CTAB), polyethylenimine (PEI), thiol compounds, mercaptosuccinic acid, dodecylbenzene sulfonic acid, triethanolamine, ammonium citrate, lignin, chitosan, tannic acid, tartaric acid, polyethyleneglycol dimethacrylate (PEGDMA), hexadecylamine, octylamine, butylamine, sodium dodecyl sulfate (SDS), cetyltrimethylammonium chloride (CTAC), formic acid, acetic acid, lactic acid, mixtures thereof, and the like may also be used as capping agents.

At step 54, the method 50 includes calcinating the mixture at 400 to 600° C., preferably 410 to 590° C., preferably 420 to 580° C., preferably 430 to 570° C., preferably 440 to 560° C., preferably 450 to 550° C., preferably 460 to 540° C., preferably 470 to 530° C., preferably 480 to 520° C., more preferably 490 to 510° C., and yet more preferably about 500° C. for 3 to 5 hours, preferably 3.1 to 4.9 hours, preferably 3.2 to 4.8 hours, preferably 3.3 to 4.7 hours, preferably 3.4 to 4.6 hours, preferably 3.5 to 4.5 hours, preferably 3.6 to 4.4 hours, preferably 3.7 to 4.3 hours, preferably 3.8 to 4.2 hours, more preferably 3.9 to 4.1 hours, and yet more preferably about 4 hours. In a preferred embodiment, the mixture is calcinated at 500° C. for 4 hours.

The product of calcination may retain a carbonaceous residue obtained from carbonization of the sugar, preferably glucose, and the subsequent calcination of a carbonized product. As the calcination of the present disclosure will conventionally occur in the absence of activators or templating agents for the carbonized product, it is considered that the retained carbonaceous residue will comprise amorphous carbon. In certain embodiments, the catalyst may comprise amorphous carbon in an amount up to about 2 wt. %, based on the weight of the catalyst. For example, the catalyst may comprise amorphous carbon in an amount up to about 1 wt. % or up to about 0.5 wt. %, based on the weight of the catalyst.

At step 56, the method 50 includes milling the calcinated mixture to form the catalyst. In some embodiments, the calcinated mixture is milled at a rate ranging from 300 to 400 rounds per minute (rpm), preferably 310 to 390 rpm, preferably 320 to 380 rpm, preferably 330 to 370 rpm, more preferably 340 to 360 rpm, and yet more preferably about 350 rpm. In a preferred embodiment, the calcined mixture is milled at a rate of 350 rpm.

In some embodiments, the calcinated mixture is milled for 5 to 60 minutes, preferably 10 to 55 minutes, preferably 15 to 50 minutes, preferably 20 to 40 minutes, more preferably 25 to 35 minutes, and yet more preferably about 30 minutes. In a preferred embodiment, the calcinated mixture is milled for 30 minutes.

The catalyst of the present disclosure may be used for hydrogen production. Accordingly, a third aspect of the present disclosure describes a method of hydrogen generation using the catalyst. The method includes hydrolyzing a borohydride salt in an aqueous solution including the catalyst to form gaseous hydrogen.

In some embodiments, the borohydride salt may include, but is not limited to, sodium borohydride, lithium borohydride, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper borohydride, thallium borohydride, gold borohydride, silver borohydride, rhodium borohydride, palladium borohydride, antimony borohydride, a combination thereof, and the like. In a preferred embodiment, the borohydride salt is sodium borohydride.

The weight ratio of the catalyst to the borohydride salt present in the aqueous solution ranges from 0.1:2 to 7:1, preferably 0.5:2 to 6:1, preferably 0.7:2 to 5:1, preferably 1:2 to 4:1, preferably 1.2:2 to 3:1, and preferably 1.5:2 to 2:1.

In some embodiments, the amount of the borohydride salt in the aqueous solution may range from 0.1 to 2 grams, preferably 0.2 to 1.6 grams, preferably 0.3 to 1.4 grams, preferably 0.4 to 1.2 grams, preferably 0.5 to 1 gram, more preferably 0.6 to 0.8 grams, and yet more preferably about 0.7 grams. In some embodiments, the amount of the borohydride salt in the aqueous solution may be greater than 2 grams.

In some embodiments, the borohydride salt is contacted with the catalyst for 0.1 to 30 minutes, preferably 1 to 25 minutes, preferably 5 to 20 minutes, and preferably 10 to 15 minutes. In some embodiments, the borohydride salt may be contacted with the catalyst for more than 30 minutes.

The rate of hydrolysis of the borohydride salt in the presence of the catalyst is 2 to 3 times greater than a rate of hydrolysis of the borohydride salt in the absence of the catalyst. In some embodiments, the rate of hydrolysis of the borohydride salt in the presence of the catalyst is 2 to 3 times greater, preferably 2.1 to 2.9 times greater, preferably 2.2 to 2.8 times greater, preferably 2.3 to 2.7 times greater, and preferably 2.4 to 2.6 times greater than a rate of hydrolysis of the borohydride salt in the absence of the catalyst. In some embodiments, the rate of hydrolysis of the borohydride salt in the presence of the catalyst may be greater than 3 times greater than a rate of hydrolysis of the borohydride salt in the absence of the catalyst.

The concentration of bismuth(III) oxide concentration in the catalyst effects hydrogen production. In some embodiments, when the borohydride salt is in contact with the catalyst having bismuth(III) oxide at a concentration ranging from 2 to 3 wt. %, preferably about 2.5 wt. %, based on the total weight of the catalyst at a temperature of 30° C., the hydrogen generation rate (HGR) is 125 to 150 mL of hydrogen per minute per gram of the borohydride salt, preferably 130 to 145 mL of hydrogen per minute per gram of the borohydride salt, and preferably 135 to 140 mL of hydrogen per minute per gram of the borohydride salt. In some embodiments, increasing the concentration of bismuth (III) oxide to 9 to 11 wt. %, preferably 9.5 to 10.5 wt. %, and more preferably about 10 wt. %, in the catalyst at the same temperature (30° C.) results in a HGR of 160 to 180 mL of hydrogen per minute per gram of the borohydride salt, preferably 165 to 175 mL of hydrogen per minute per gram of the borohydride salt. In another embodiment, when the borohydride salt is in contact with the catalyst having 4 to 6 wt. %, preferably 4.5 to 5.5 wt. %, and more preferably about 5 wt. %, of bismuth(III) oxide based on the total weight of the catalyst, at a temperature of 30° C., the HGR is 480 to 500 mL of hydrogen per minute per gram of the borohydride salt, preferably 485 to 495 mL of hydrogen per minute per gram of the borohydride salt.

Temperature is another factor affecting the HGR with the method of present disclosure. In some embodiments, the borohydride salt is contacted with the catalyst at a temperature ranging from 25 to 50° C., preferably 30 to 45° C., and preferably 35 to 40° C. In a preferred embodiment, the borohydride salt is contacted with the catalyst at a temperature of about 30 to 45° C.

In some embodiments, when the borohydride salt is contacted with the catalyst having a bismuth(III) oxide concentration of 4 to 6 wt. %, preferably about 5 wt. % based on the total weight of the catalyst, the HGR ranges from 480 to 500 mL of hydrogen per minute per gram of the borohydride salt, preferably 485 to 495 mL of hydrogen per minute per gram of the borohydride salt, and preferably 488 to 492 mL of hydrogen per minute per gram of the borohydride salt at a temperature 30° C. In some embodiments, when the borohydride salt is contacted with the catalyst having a bismuth(III) oxide concentration of 4 to 6 wt. %, preferably about 5 wt. % based on the total weight of the catalyst, the HGR ranges from 1100 to 1120 mL of hydrogen per minute per gram of the borohydride salt, preferably 1105 to 1115 mL of hydrogen per minute per gram of the borohydride salt, and more preferably about 1111 mL of hydrogen per minute per gram of the borohydride salt at a temperature of 35° C. In some embodiments, when the borohydride salt is contacted with the catalyst having a bismuth(III) oxide concentration of 4 to 6 wt. %, preferably about 5 wt. % based on the total weight of the catalyst, the HGR ranges from 1420 to 1440 mL of hydrogen per minute per gram of the borohydride salt, preferably 1425 to 1430 mL of hydrogen per minute per gram of the borohydride salt, and more preferably about 1428 mL of hydrogen per minute per gram of the borohydride salt at a temperature of 40° C. In some embodiments, when the borohydride salt is contacted with the catalyst having a bismuth(III) oxide concentration of 4 to 6 wt. %, preferably about 5 wt. % based on the total weight of the catalyst, the HGR ranges from 1990 to 2010 mL of hydrogen per minute per gram of the borohydride salt, preferably 1995 to 2005 mL of hydrogen per minute per gram of the borohydride salt, and more preferably about 2000 mL of hydrogen per minute per gram of the borohydride salt at a temperature of 45° C.

In some embodiments, the activation energy required to generate hydrogen ranges from 65 to 75 kJ/mol, preferably 66 to 74 kJ/mol, preferably 67 to 73 kJ/mol, preferably 68 to 72 kJ/mol, more preferably 69 to 71 kJ/mol, and yet more preferably 69 to 70 kJ/mol. In a preferred embodiment, the activation energy required to generate hydrogen is about 69.2 kJ/mol.

EXAMPLES

The disclosure will now be illustrated with working examples, which are intended to illustrate the working of the disclosure and not intended to restrictively imply any limitations on the scope of the present disclosure, as many variations thereof are possible without departing from the spirit and scope of the present disclosure. The following examples demonstrate a sunscreen formulation. The following examples demonstrate a method of hydrogen ($H_2$) generation. The examples are provided solely for illustration and are not to be construed as limitations of the present disclosure, as many variations thereof are possible without departing from the spirit and scope of the present disclosure.

Example 1: Synthesis of $Bi_2O_3@SiO_2$ Composite Catalyst

According to the present disclosure, $Bi_2O_3@SiO_2$ was synthesized with $Bi_2O_3$ in an amount of 2.5 wt. %, 5 wt. %, and 10 wt. % by milling bismuth nitrate ($Bi(NO_3)_3 \cdot 5H_2O$). The bismuth nitrate was milled with a fumed silica alongside with 2.0 grams (g) of glucose as a fuel and capping agent. The resultant mixture was milled at 350 rounds per minute (rpm) for 30 minutes, with 5 stainless steel balls with a diameter of about 1.0 cm, in a stainless-steel milling crucible with a 100 mL capacity. The obtained mixture was calcined in a porcelain crucible at 500° C. for 4.0 hours. The product was milled at the same pre-identified conditions for 15 minutes and collected thereafter.

Figure 2A:
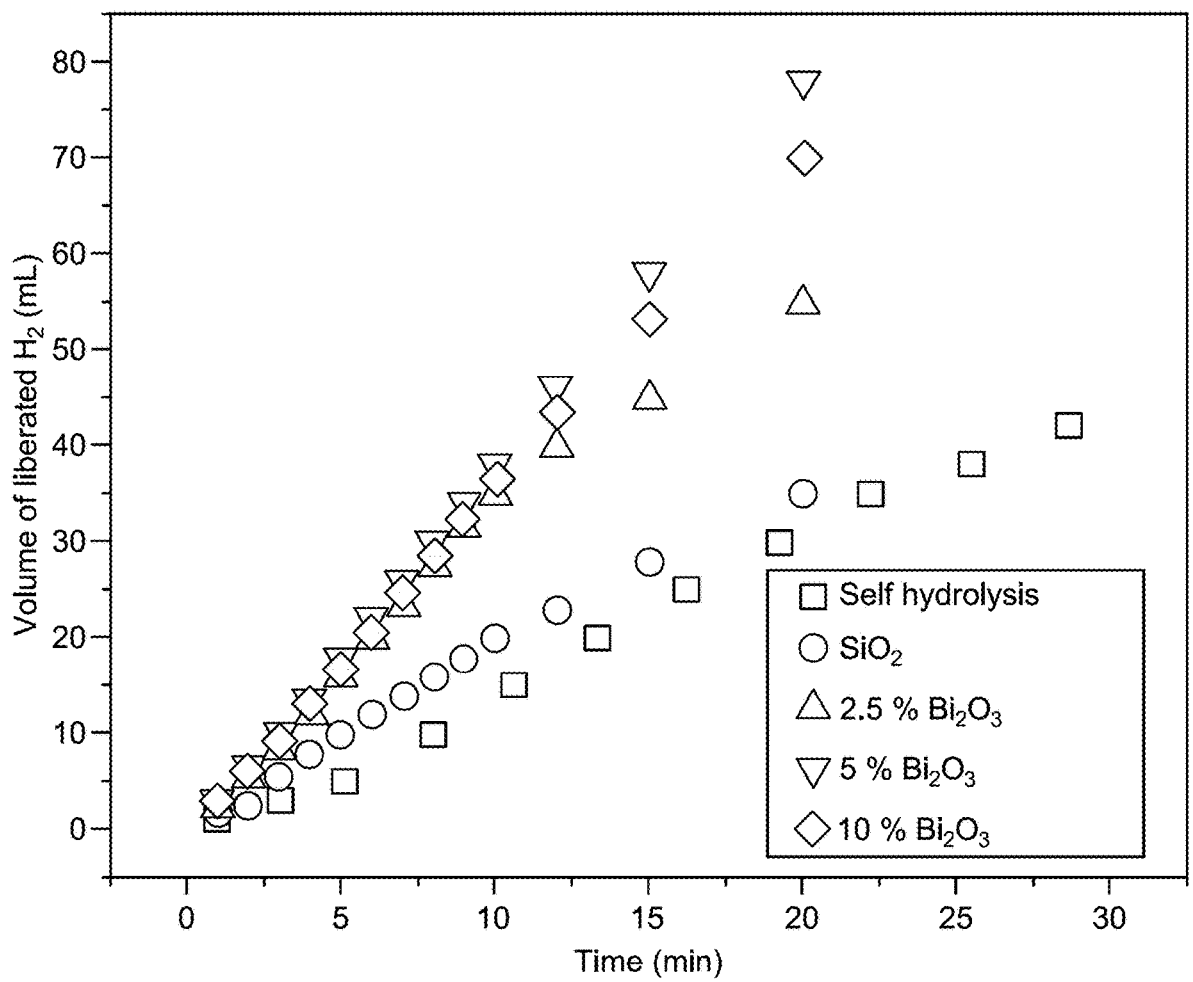
FIG. 2A is a graph depicting a variation in the volume of liberated hydrogen ($H_2$) versus reaction time, according to certain embodiments.
Figure 2B:
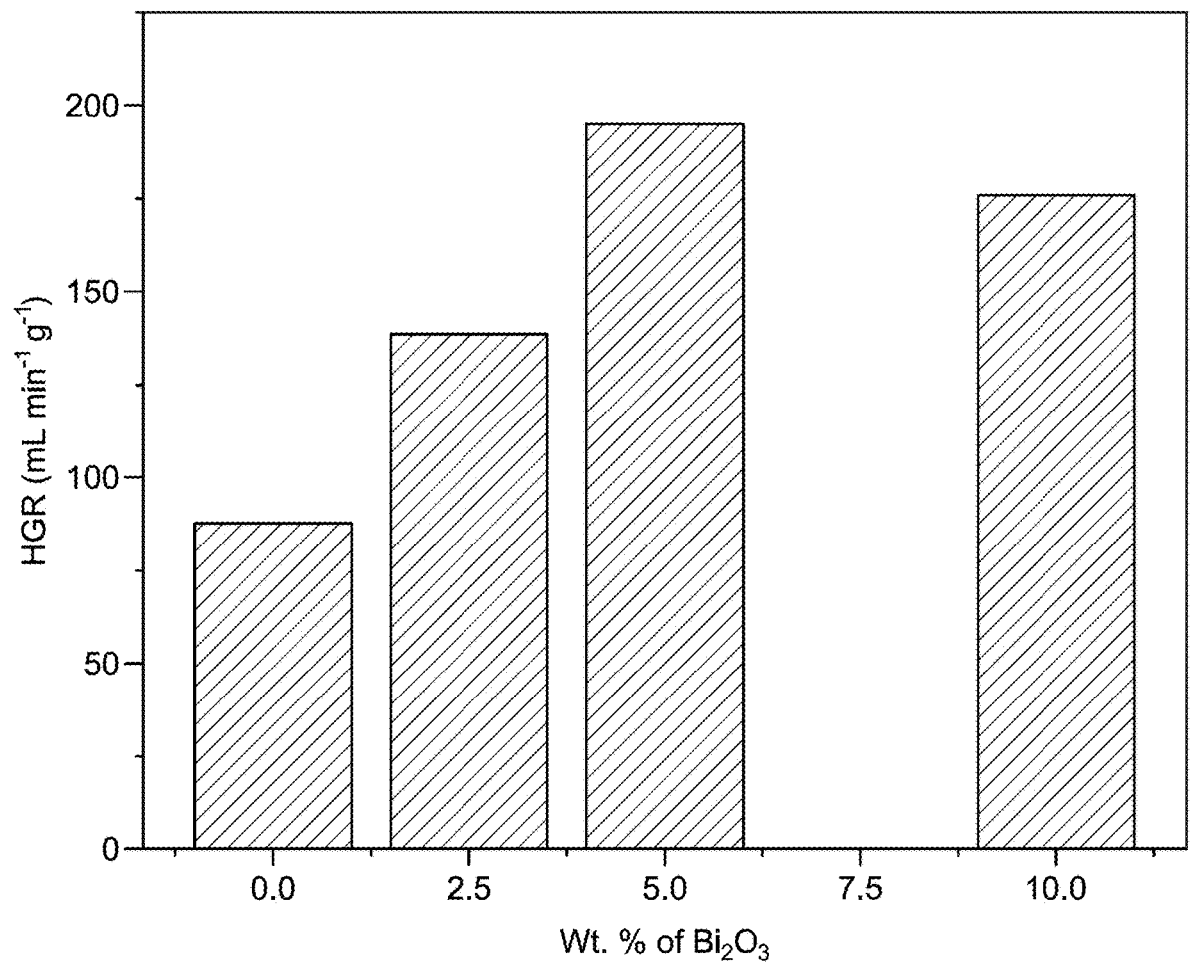
FIG. 2B is a graph depicting hydrogen generation rates (HGR) versus weight percent of $Bi_2O_3$, according to certain embodiments.

In accordance with the present disclosure, the composite catalyst produced herein may generate clean and pure hydrogen effectively and efficiently. FIG. 2A depicts hydrolysis of $NaBH_4$ with and without a $Bi_2O_3@SiO_2$ catalyst. Further, the catalytic actions of $Bi_2O_3$-loaded catalysts were observed where all catalysts showed a catalytic activity higher than the self-hydrolysis process, as seen in FIG. 2A. Furthermore, the results depict that among the catalysts loaded with 2.5 wt. % to 10 wt. % bismuth(II) oxide ($Bi_2O_3$), the 5 wt. % $Bi_2O_3$ catalyst exhibited the highest activity, with a hydrogen generation rate (HGR) of 198 milliliter per minute per grams (mL $min^{-1}$ $g^{-1}$) at a room temperature of about 30° C., as shown in FIG. 2B.

Figure 3A:
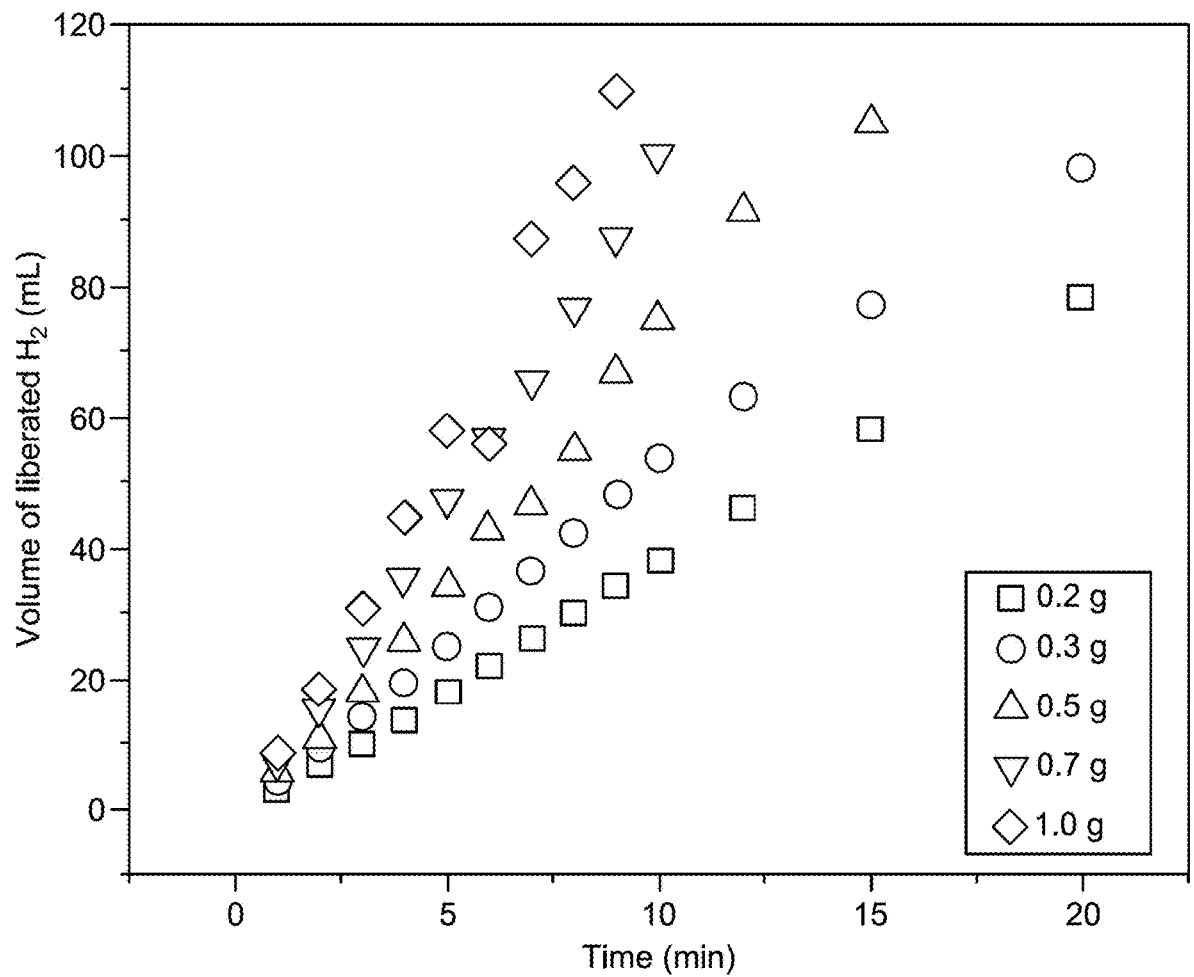
FIG. 3A is a graph depicting variation in the volume of liberated $H_2$ versus reaction time over 5 wt. % $Bi_2O_3SiO_2$ composite catalyst calcined at 500° C., according to certain embodiments.
Figure 3B:
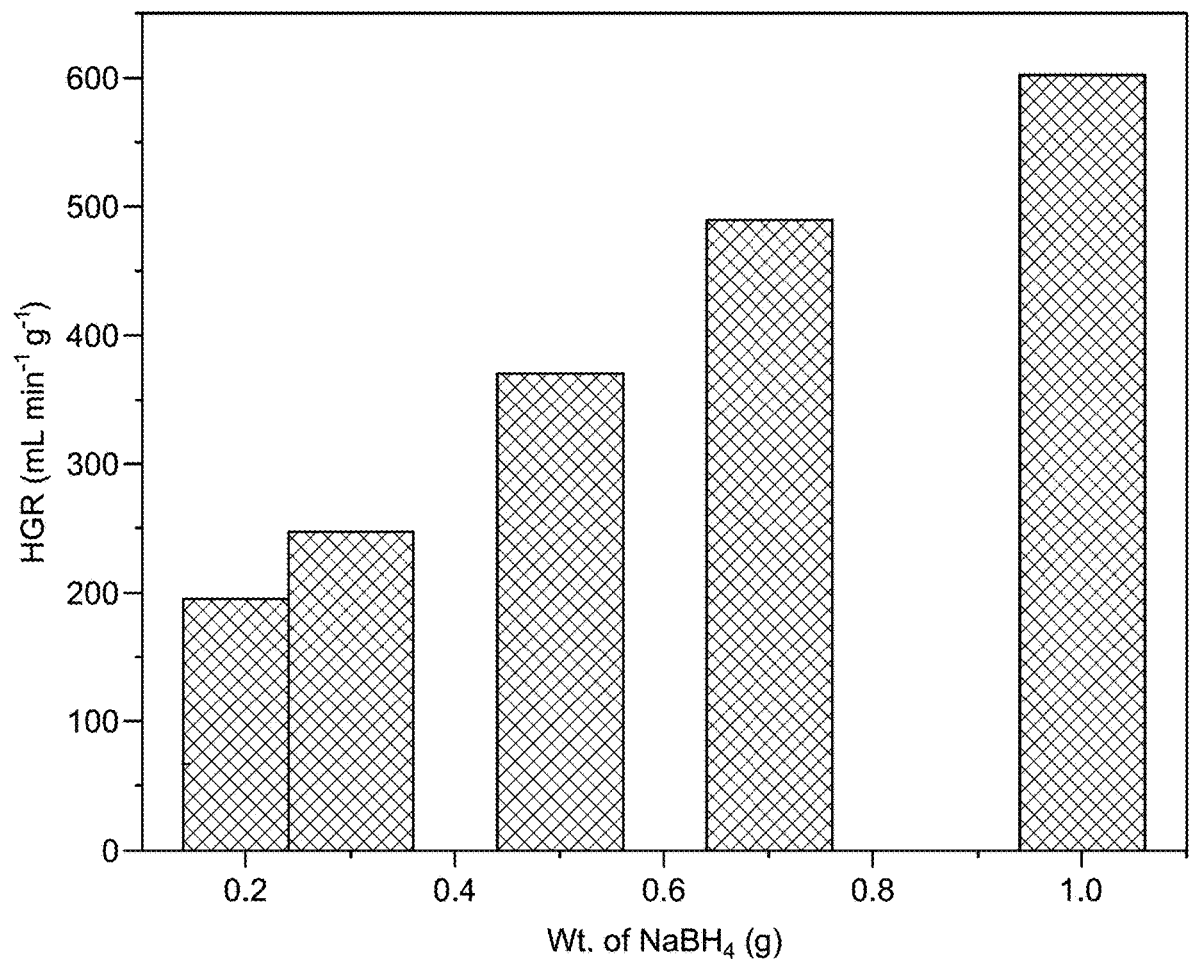
FIG. 3B is a graph depicting HGR with wt. % of $NaBH_4$, over 5 wt. % $Bi_2O_3/SiO_2$ composite catalyst calcined at 500° C., according to certain embodiments.
Figure 4A:
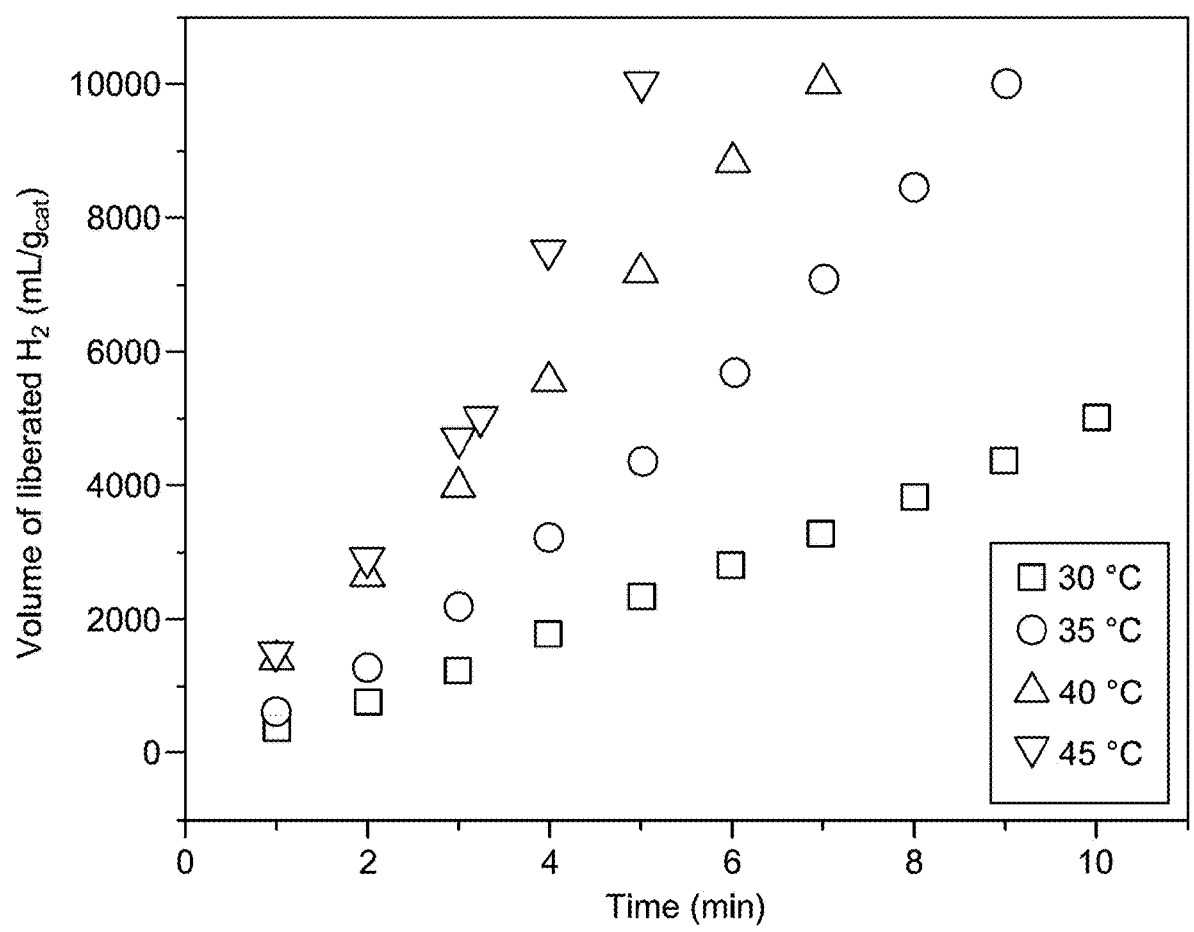
FIG. 4A is a graph depicting volume of liberated $H_2$ versus reaction time over 5 wt. % $Bi_2O_3/SiO_2$ composite catalyst calcined at 500° C., according to certain embodiments.
Figure 4B:
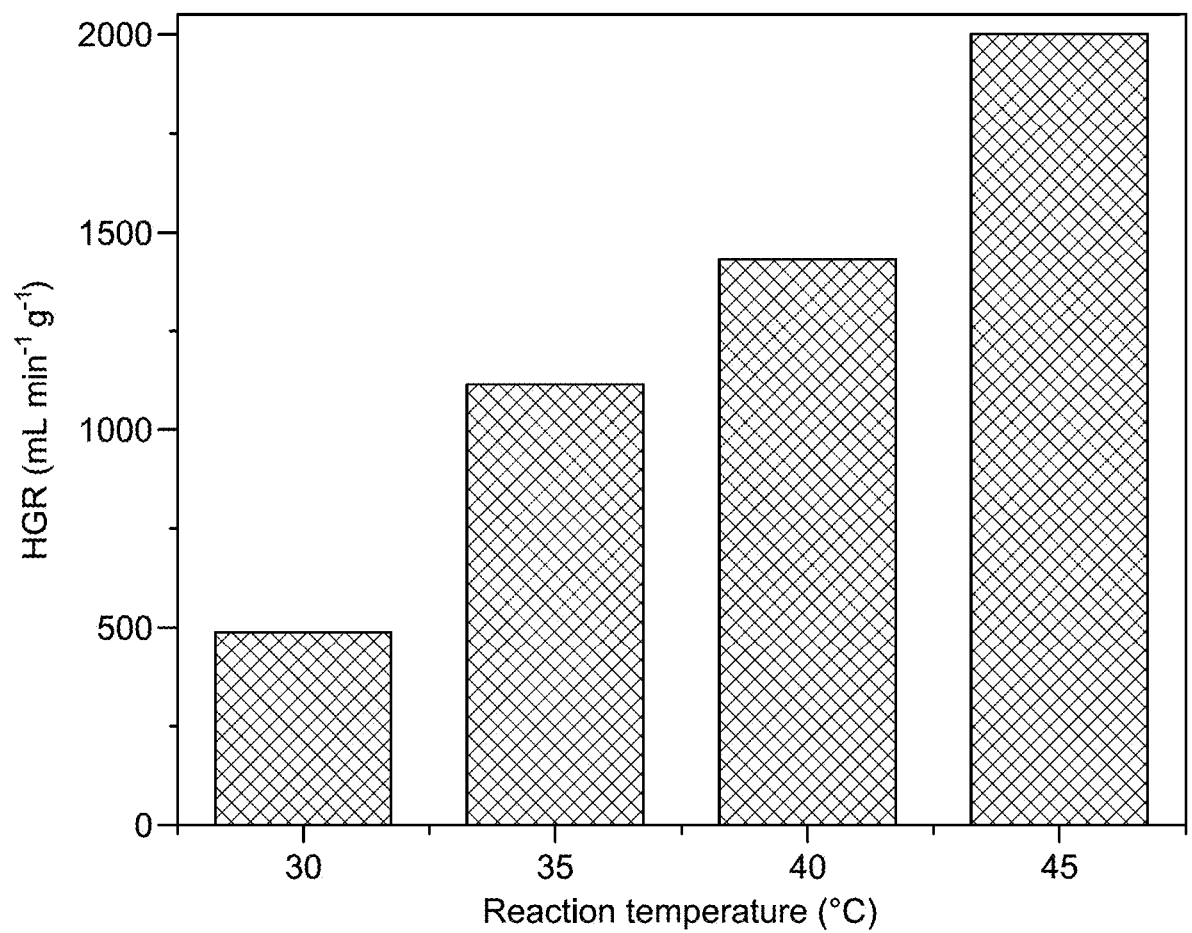
FIG. 4B is a graph depicting HGR as a function of reaction temperature for 5 wt. % $Bi_2O_3/SiO_2$ composite catalyst calcined at 500° C., according to certain embodiments.

The influence of temperature and $NaBH_4$ mass on the catalytic hydrolysis of $NaBH_4$ over a 5 wt. % $Bi_2O_3/SiO_2$ catalyst was evaluated, as depicted in FIGS. 3A-3B and FIGS. 4A-4B. FIGS. 3A-3B depict that as the weight of $NaBH_4$ increases, the hydrolysis rate rises correspondingly. At around 30° C., HGR reaches about 195 mL $min^{-1}$ $g^{-1}$, 245 mL $min^{-1}$ $g^{-1}$, 370.4 mL $min^{-1}$ $g^{-1}$, 488 mL $min^{-1}$ $g^{-1}$, and 600 mL $min^{-1}$ $g^{-1}$, for $NaBH_4$ amounts of 0.2 g, 0.3 g, 0.5 g, 0.7 g, and 1.0 g, respectively. Further, the influence of reaction temperature on the catalytic hydrolysis process was examined at a temperature range of 30° C. to 45° C. using 0.7 g of 5 wt. % $Bi_2O_3/SiO_2$, as shown in FIGS. 4A-4B. HGR values of 488 mL $min^{-1}$ $g^{-1}$, 1111 mL $min^{-1}$ $g^{-1}$, 1428 mL $min^{-1}$ $g^{-1}$, and 2000 mL $min^{-1}$ $g^{-1}$ were obtained at reaction temperatures of 30° C., 35° C., 40° C., and 45° C., respectively. The activation energy for this reaction was about 69.2 kilojoules per mole (kJ/mol).

Aspects of the present disclosure describe a $Bi_2O_3@SiO_2$ catalyst that may be used to generate clean and pure hydrogen efficiently at a high hydrogen generation rate. The method as described herein provides an efficient process for the hydrolysis of $NaBH_4$, applicable with the catalyst, as shown in FIGS. 2A-2B. Catalytic performance of $Bi_2O_3@SiO_2$ was evaluated with $Bi_2O_3$ loadings of 2.5 wt. %, 5 wt. %, and 10 wt. %. Catalysts examined in the present disclosure showed enhanced activity compared to the self-hydrolysis process. Particularly, 0.7 g of 5 wt. % $Bi_2O_3@SiO_2$ achieves hydrogen generation rates of 488 mL $min^{-1}$ $g^{-1}$, 1111 mL $min^{-1}$ $g^{-1}$, 1428 mL $min^{-1}$ $g^{-1}$, and 2000 mL $min^{-1}$ $g^{-1}$ at reaction temperatures of 30° C., 35° C., 40° C., and 45° C., respectively.

Numerous modifications and variations of the present disclosure are possible in light of the above teachings. It is, therefore, to be understood that within the scope of the appended claims, the disclosure may be practiced otherwise than as specifically described herein.

The invention claimed is:

1. A method of hydrogen generation, comprising:
   hydrolyzing a borohydride salt in an aqueous solution comprising a catalyst to form gaseous hydrogen,
   wherein the catalyst is a bismuth(III) oxide-doped silicon dioxide,
   wherein the amount of bismuth(III) oxide is from 2 to 12 wt. % based on a total weight of the bismuth(III) oxide-doped silicon dioxide,
   wherein the bismuth(III) oxide is dispersed in silicon dioxide in the catalyst,
   wherein a weight ratio of the catalyst to the borohydride salt present in the aqueous solution is from 0.1:2 to 7:1,
   wherein a rate of hydrolysis of the borohydride salt in the presence of the catalyst is 2 to 3 times greater than a rate of hydrolysis of the borohydride salt in the absence of the catalyst.

2. The method of claim 1, wherein the borohydride salt is sodium borohydride.

3. The method of claim 1, wherein the amount of bismuth (III) oxide is from 2 to 3 wt. % based on a total weight of the bismuth(III) oxide-doped silicon dioxide.

4. The method of claim 1, wherein the amount of bismuth (III) oxide is from 4 to 6 wt. % based on a total weight of the bismuth(II) oxide-doped silicon dioxide.

5. The method of claim 1, wherein the amount of bismuth (III) oxide is from 9 to 10 wt. % based on a total weight of the bismuth(II) oxide-doped silicon dioxide.

6. The method of claim 1, wherein the hydrolyzing occurs at a temperature of 25 to 50° C.

7. The method of claim 1, wherein a hydrogen generation rate is from 100 to 2200 mL/minute per gram of the borohydride salt.

8. The method of claim 4, wherein the hydrolyzing occurs at a temperature of 30° C. and a hydrogen generation rate is from 480 to 500 mL of hydrogen/minute per gram of the borohydride salt.

9. The method of claim 4, wherein the hydrolyzing occurs at a temperature of 35° C. and a hydrogen generation rate is from 1100 to 1120 mL of hydrogen/minute per gram of the borohydride salt.

10. The method of claim 4, wherein the hydrolyzing occurs at a temperature of 40° C. and a hydrogen generation rate is from 1420 to 1440 mL of hydrogen/minute per gram of the borohydride salt.

11. The method of claim 4, wherein the hydrolyzing occurs at a temperature of 45° C. and a hydrogen generation rate is from 1990 to 2010 mL of hydrogen/minute per gram of the borohydride salt.

12. The method of claim 1, wherein the catalyst is made by a process comprising:
   milling a bismuth salt, silica, and a sugar to form a mixture;
   calcinating the mixture at 400 to 600° C. for 3 to 5 hours; and
   milling the calcinated mixture to form the catalyst.

13. The method of claim 12, wherein the sugar is glucose.

14. The method of claim 12, wherein the milling occurs at a rate of 300 to 400 rounds per minute.

15. The method of claim 12, wherein the milling occurs for 5 to 60 minutes.

16. The method of claim 1, wherein the gaseous hydrogen is formed in 0.1 to 30 minutes.

17. The method of claim 1, wherein the amount of the borohydride salt present in the aqueous solution is 0.1 to 2 grams.

18. The method of claim 3, wherein the hydrolyzing occurs at a temperature of 30° C. and a hydrogen generation rate is from 125 to 150 mL of hydrogen/minute per gram of the borohydride salt.

19. The method of claim 5, wherein the hydrolyzing occurs at a temperature of 30° C. and a hydrogen generation rate is from 160 to 180 mL of hydrogen/minute per gram of the borohydride salt.

20. The method of claim 1, wherein generating hydrogen has an activation energy of 65 to 75 kJ/mol.

\* \* \* \* \*